United States Patent
VanderLugt

(10) Patent No.: US 12,145,410 B2
(45) Date of Patent: Nov. 19, 2024

(54) VARIABLE TRAILER SWAY DAMPING

(71) Applicant: Robert Bosch GmbH, Stuttgart (DE)

(72) Inventor: David Neil VanderLugt, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 239 days.

(21) Appl. No.: 17/823,893

(22) Filed: Aug. 31, 2022

(65) Prior Publication Data
US 2024/0066933 A1 Feb. 29, 2024

(51) Int. Cl.
*B60D 1/32* (2006.01)
*F16F 9/32* (2006.01)
*F16F 9/512* (2006.01)

(52) U.S. Cl.
CPC ............ *B60D 1/322* (2013.01); *F16F 9/3292* (2013.01); *F16F 9/5126* (2013.01); *F16F 2222/12* (2013.01); *F16F 2232/02* (2013.01)

(58) Field of Classification Search
CPC ...................................................... B60D 1/322
See application file for complete search history.

(56) References Cited

U.S. PATENT DOCUMENTS

| | | | | |
|---|---|---|---|---|
| 3,497,241 A | * | 2/1970 | Hicks ..................... | B60D 1/322 280/455.1 |
| 3,502,350 A | * | 3/1970 | Haswell ................. | B60D 1/322 188/306 |
| 3,512,803 A | * | 5/1970 | Hines ................. | B62D 53/0878 280/455.1 |
| 3,722,920 A | * | 3/1973 | Reese .................... | B60D 1/322 188/269 |
| 3,893,692 A | | 7/1975 | Presley et al. | |
| 4,313,616 A | | 2/1982 | Howard | |
| 7,354,056 B2 | | 4/2008 | Namuduri et al. | |
| 8,033,561 B2 | | 10/2011 | McCune | |
| 8,360,457 B2 | | 1/2013 | Timmons, Jr. | |
| 11,472,497 B2 | * | 10/2022 | Kim .................... | B62D 53/0871 |
| 2006/0138746 A1 | | 6/2006 | Donnard | |
| 2015/0105975 A1 | | 4/2015 | Dunn | |

FOREIGN PATENT DOCUMENTS

| | | | | |
|---|---|---|---|---|
| CN | 200964039 Y | | 10/2007 | |
| EP | 1055573 A1 | * | 11/2000 | ............ B60D 1/322 |
| ES | 109674 U | | 1/1965 | |
| WO | WO-0052354 A1 | * | 9/2000 | ............... B60D 1/32 |

* cited by examiner

*Primary Examiner* — Kevin Hurley
(74) *Attorney, Agent, or Firm* — Michael Best & Friedrich LLP

(57) ABSTRACT

Examples provide a trailer hitch system for connecting a tow vehicle and a trailer. Some examples of the system include a vehicle connector configured to be coupled to the tow vehicle and a chamber coupled to the vehicle connector. The chamber includes a center, an interior wall, and a valve for modulating a flow of hydraulic fluid within the chamber. A pin extends through the chamber and is configured to rotate within the chamber. A paddle is coupled to the pin and sized and shaped to sit substantially flush against the interior wall. The paddle is configured to push the hydraulic fluid in a first direction and a second direction through the valve. A trailer connector is coupled to the pin and configured to be coupled to the trailer.

12 Claims, 10 Drawing Sheets

VARIABLE TRAILER SWAY DAMPING

BACKGROUND

Embodiments, examples, and aspects relate to, among other things, a system and method for trailer sway damping.

SUMMARY

One example provides a trailer hitch system for connecting a tow vehicle. The trailer hitch system includes a vehicle connector configured to be coupled to the tow vehicle and including a chamber. The chamber includes a center, an interior wall, and a valve for modulating a flow of hydraulic fluid within the chamber. The trailer hitch system also includes a pin extending through the chamber, the pin configured to rotate within the chamber, and a paddle coupled to the pin and sized and shaped to sit substantially flush against the interior wall. The paddle is configured to push the hydraulic fluid in a first direction and a second direction through the valve. The trailer hitch system further includes a trailer connector coupled to the pin and configured to be coupled to the trailer.

In some instances, the trailer hitch system also includes an electronic processor configured to control the valve.

In some instances, the electronic processor is configured to determine an actual angle of the trailer relative to the tow vehicle, determine a radius of the path of the tow vehicle, determine a target trailer angle based on the radius, determine an angle deviation based on the actual trailer angle and the target trailer angle, and control the valve based on the angle deviation.

In some instances, the electronic processor is configured to increase the opening of the valve in response to an increase in the angle deviation, and decrease the opening of the valve in response to a decrease in the angle deviation.

In some instances, the electronic processor is configured to receive a sensed yaw-rate, a sensed steering angle, and a sensed longitudinal velocity from sensors associated with the tow vehicle, and determine the radius of the path of the tow vehicle based on the sensed yaw-rate, the sensed steering angle, and the sensed longitudinal velocity of the tow vehicle.

In some instances, the chamber includes a sensor configured to measure a rotation of the paddle, and the electronic processor is configured to determine the actual trailer angle based on the measured rotation of the paddle.

In some instances, the trailer hitch system also includes a camera, and the electronic processor is configured to estimate the actual angle of the trailer based on images received from the camera.

DETAILED DESCRIPTION

Figure 1:
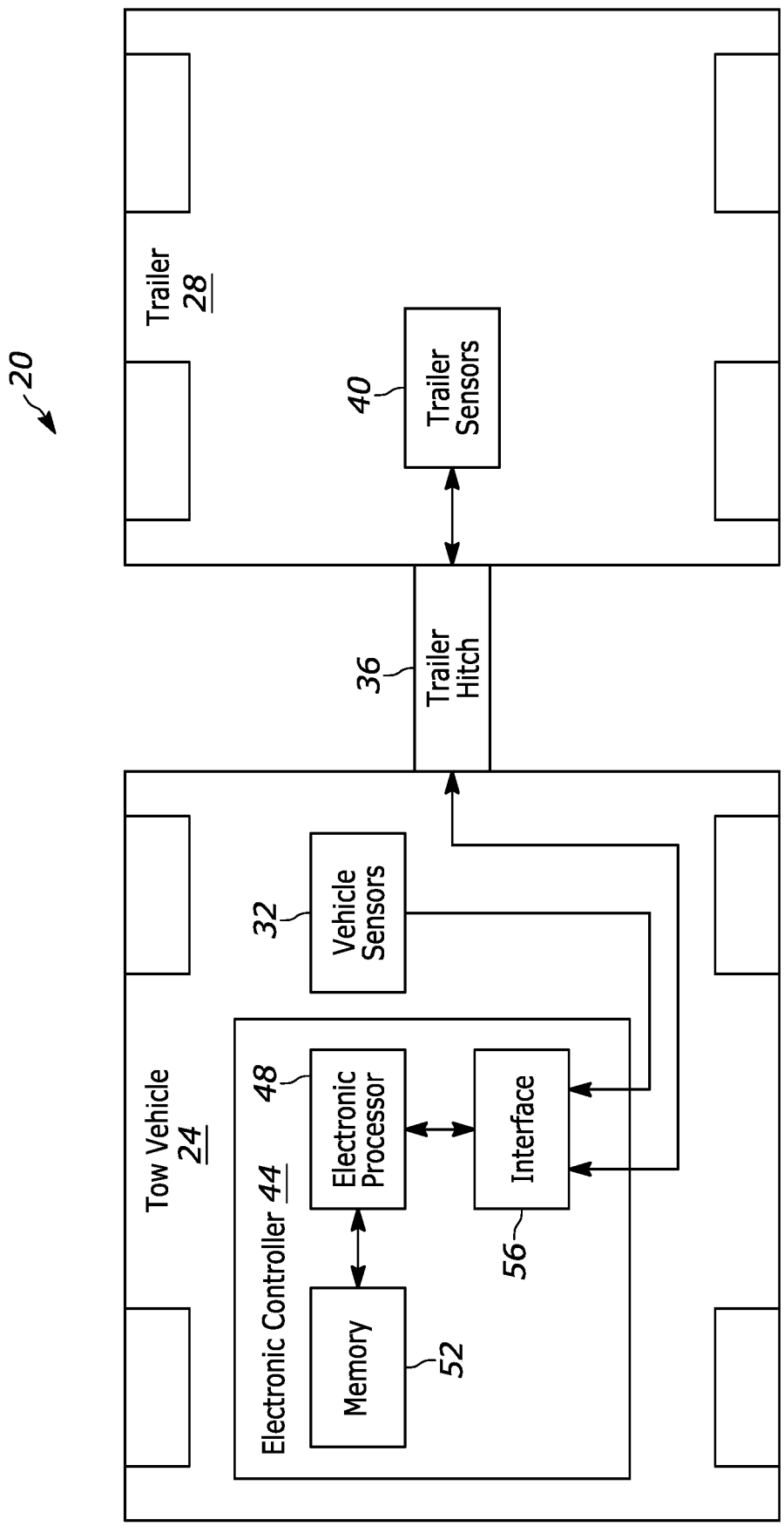
FIG. 1 illustrates a trailer hitch system, according to some aspects.

Before any aspects, features, or instances are explained in detail, it is to be understood that the aspects, features, or instances are not limited in their application to the details of construction and the arrangement of components set forth in the following description or illustrated in the following drawings. Other instances are possible and are capable of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software based devices, as well as a plurality of different structural components may be utilized to implement the invention. For example, "control units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only. In some instances, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

Trailer sway often occurs due to perpendicular forces acting on the trailer that cause the trailer to move side to side behind a tow vehicle. Trailer sway can increase the amount of effort needed to control the tow vehicle, and can result in an unstable trailer system.

FIG. 1 illustrates one example of a trailer hitch system 20 for damping trailer sway. The trailer hitch system 20 includes a tow vehicle 24 and a trailer 28. The tow vehicle 24, although illustrated as a four-wheeled vehicle, may encompass various types and designs of wheeled vehicles. For example, the tow vehicle 24 may be an automobile, a motorcycle, a truck, a bus, a semi-tractor, and others. The tow vehicle 24 may include one or more vehicle sensors 32 for detecting the operating characteristics of the tow vehicle 24. The vehicle sensors 32 include, for example, steering angle sensors (e.g., capable of detecting wheel angle of the tow vehicle 24), speed sensors (e.g., capable of detecting wheel speed of the tow vehicle 24), accelerometers to sense x-axis, y-axis, and z-axis accelerations, and/or a yaw-rate sensor. In some instances, the vehicle sensors 32 are similar to sensor sets used in an electronic stability control (ESC) system and similar vehicle control systems.

The trailer 28 although illustrated as a four-wheeled trailer, may encompass various types and designs of trailers. For example, the trailer 28 may include two wheels instead of four. The tow vehicle 24 and the trailer 28 are connected via a trailer hitch 36 that is mounted to the tow vehicle 24 and extends to the trailer 28. The trailer 28 includes one or more trailer sensors 40 for detecting the angle of the trailer 28 relative to the tow vehicle 24. In some embodiments, the trailer sensors 40 include a rear view camera coupled to the tow vehicle 24 and capable of detecting the angle of the trailer 28 relative to the tow vehicle 24.

In the example shown in FIG. 1, the tow vehicle 24 includes an electronic controller 44. The electronic controller 44 includes a plurality of electrical and electronic components that provide power, operation control, and protection to the components and modules within the electronic controller 44. The electronic controller 44 includes, among other things, an electronic processor 48 (such as a programmable electronic microprocessor, microcontroller, or similar device), a memory 52 (for example, a non-transitory, machine readable medium), and an interface 56. The electronic processor 48 is communicatively connected to the memory 52 and the interface 56. The electronic processor 48 is configured to receive sensor data from the vehicle sensors 32 and the trailer sensors 40 via the interface 56. In some instances, the electronic processor is configured to process received sensor data. The electronic processor 48 is further configured to receive other characteristic data corresponding to the tow vehicle 24 and/or the trailer 28. For example, the electronic processor 48 may receive data corresponding to the dimensions of the trailer, the dimensions of the vehicle, the weight of the trailer, the weight of the vehicle, the wheelbase of the trailer, and/or the wheelbase of the vehicle. In some instances, the electronic processor 48, in coordination with software stored in the memory 52 and information from the sensors, is configured to implement, among other things, the methods described herein.

The electronic controller 44 may be implemented in several independent controllers (for example, programmable electronic controllers) each configured to perform specific functions or sub-functions. Additionally, the electronic controller 44 may contain sub-modules that include additional electronic processors, memory, or application specific integrated circuits (ASICs) for handling communication functions, processing of signals, and application of the methods listed below. In other examples, the electronic controller 44 includes additional, fewer, or different components.

The memory 52 is a non-transitory computer readable medium that includes, for example, a program storage area and a data storage area. The program storage area and the data storage area can include combinations of different types of memory, for example read-only memory ("ROM"), random access memory ("RAM") (for example, dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. In one example, the electronic processor 48 is connected to the memory 52 and executes software instructions that are capable of being stored in a RAM of the memory 52 (for example, during execution), a ROM of the memory 52 (for example, on a generally permanent basis), or another non-transitory computer-readable medium. The software includes, for example, firmware, one or more applications, program data, filters, rules, one or more program modules, and other executable instructions. The electronic processor 48 is configured to retrieve from the memory 52 and execute, among other things, instructions related to the control processes and methods described herein.

Figure 2:
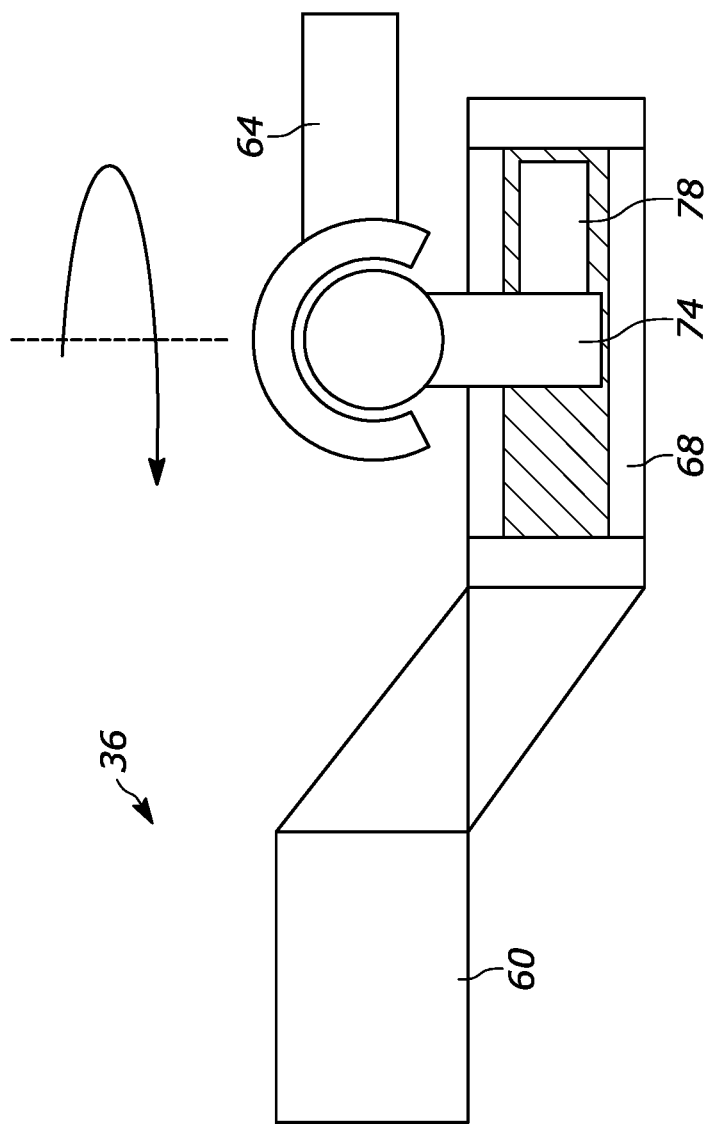
FIG. 2 illustrates a cross-sectional side view of a trailer hitch, according to some aspects.

FIG. 2 illustrates a cross-sectional side view of the trailer hitch 36, according to some examples. The trailer hitch 36 includes a vehicle connector 60 for connecting the trailer hitch 36 to the tow vehicle 24, and a trailer connector 64 for connecting the trailer hitch 36 to the trailer 28. An enclosed chamber 68 is defined or located within the vehicle connector 60, such the chamber 68 is stationary relative to the vehicle connector 60. The chamber 68 includes a an amount or volume of fluid, for example hydraulic fluid. The chamber 68 may have a total volume of 250 milliliters. In some instances, the chamber 68 is approximately cylindrical in shape, and includes a ceiling, a floor, and an interior wall. A pin 74 extends through the center of the chamber 68. In the illustrated example, the pin 74 extends from an exterior of the chamber 68, through the ceiling, and to the floor of the chamber 68. The pin 74 is flush with the ceiling and the floor of the chamber 68 such that no fluid is able to escape the chamber 68. The pin 74 is rigidly connectable to the trailer connector 64 such that, when connected, the pin 74 is stationary relative to the trailer connector 64. The pin 74 may be connected to the trailer connector 64 by aa suitable means. For example, the trailer connector 64 may be clamped to the pin 74, or a fastener may hold the trailer connector 64 to the pin 74. In some instances, the trailer connector 64 is welded or otherwise permanently connected to the pin 74. The pin 74 is configured to rotate within the chamber 68. In one example, a rotation of the trailer connector 64 causes a rotation of the pin 74 within the chamber 68. In another example, a rotation of the vehicle connector 60 causes the chamber 68 to rotate about the pin 74. A paddle 78 is rigidly coupled to the pin 74 within the chamber 68 such that the paddle 78 rotates with the pin 74. In some instances, the paddle 78 is sized and shaped to sit substantially flush against at least a portion of the ceiling, floor, and interior wall of the chamber 68 such that hydraulic fluid cannot not flow past the paddle 78. In some instances, the paddle 78 is sized to allow at least some hydraulic fluid to pass across the paddle 78.

Figure 3:
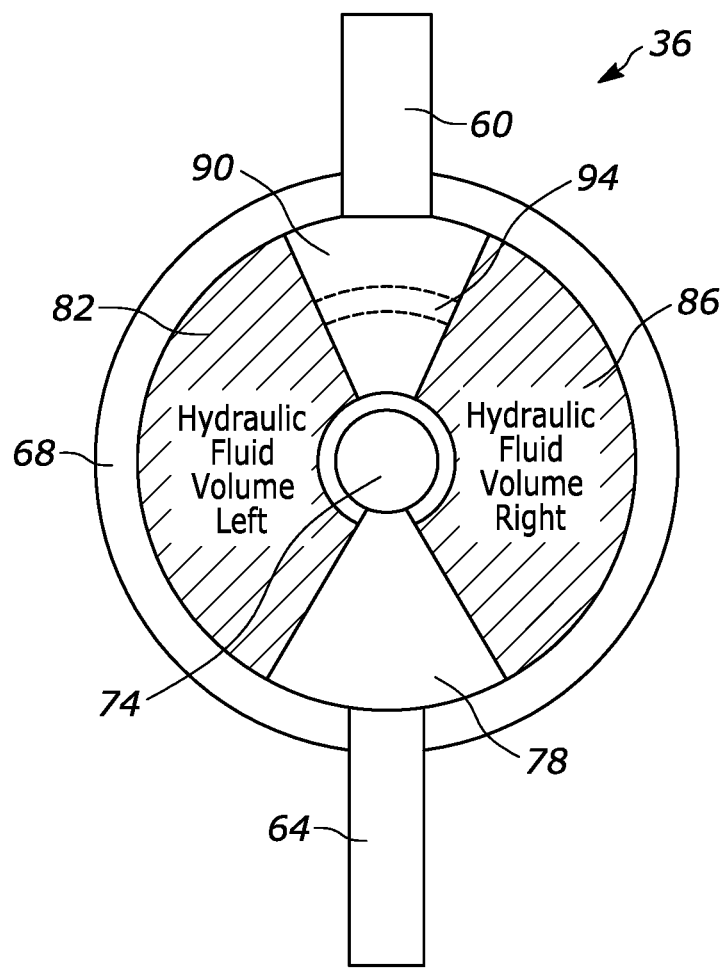
FIG. 3 illustrates a cross-sectional top view of a trailer hitch, according to some aspects.

FIG. 3 illustrates a cross-sectional top view of the trailer hitch 36, according to some examples. In some instances, the chamber 68 includes a first volume 82 and a second volume 86, each configured to contain hydraulic fluid, and separated by the paddle 78 and by a fluid partition 90 extending from the interior wall towards the pin 74 connection. The partition includes a valve 94, or port 94, extending between the first volume 82 and the second volume 86. The valve 94 modulates the flow of hydraulic fluid between the left volume and the right volume. The paddle 78 is configured to push the hydraulic fluid through the valve 94 in a first direction and a second direction. The degree or percent that the valve 94 is open determines how much resistance the paddle 78 experiences when pushing the fluid through the valve 94. Because the trailer connector 64, the pin 74, and the paddle 78 are each immovable relative to each other when connected, the resistance experienced by the paddle 78 is also experienced by the pin 74 rotating within the chamber 68, and the trailer 28 rotating relative to the tow vehicle 24. The flow of hydraulic fluid through the valve 94 creates a damping force. Thus, the trailer hitch 36 is able to damp trailer sway that may occur as the tow vehicle 24 tows the trailer 28.

In some instances, the valve 94 is electrically connected to the electronic processor 48. The electronic processor 48 controls the opening of the valve 94 in order to module the flow of hydraulic fluid within the chamber 68 between the first volume 82 and the second volume 86. For example, when the valve 94 is partially open (e.g., 20% open), the paddle 78 experiences greater resistance when pushing fluid through the valve 94. In contrast, when the valve 94 is fully open (e.g., 100% open), the paddle 78 experiences less resistance when pushing the fluid through the valve 94. The percent opening of the valve 94, and in turn the amount of resistance experienced by the paddle 78, controls the sway of the trailer 28.

Figure 4:
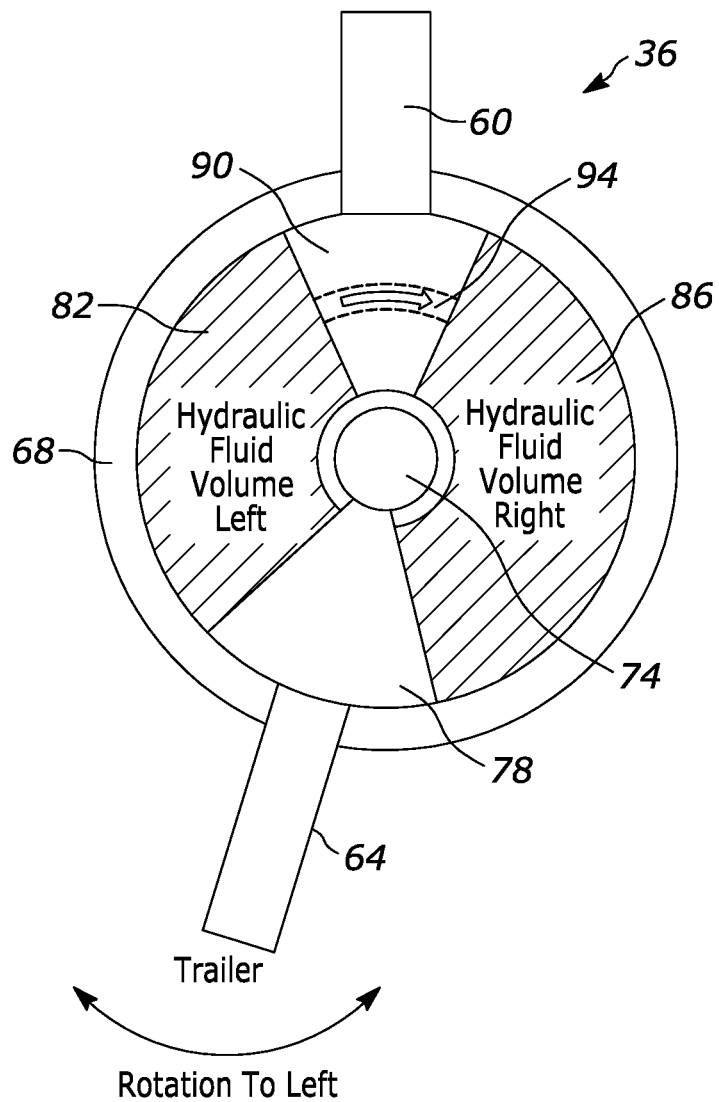
FIG. 4 illustrates a cross-sectional top view of a trailer hitch, according to some aspects.
Figure 5:
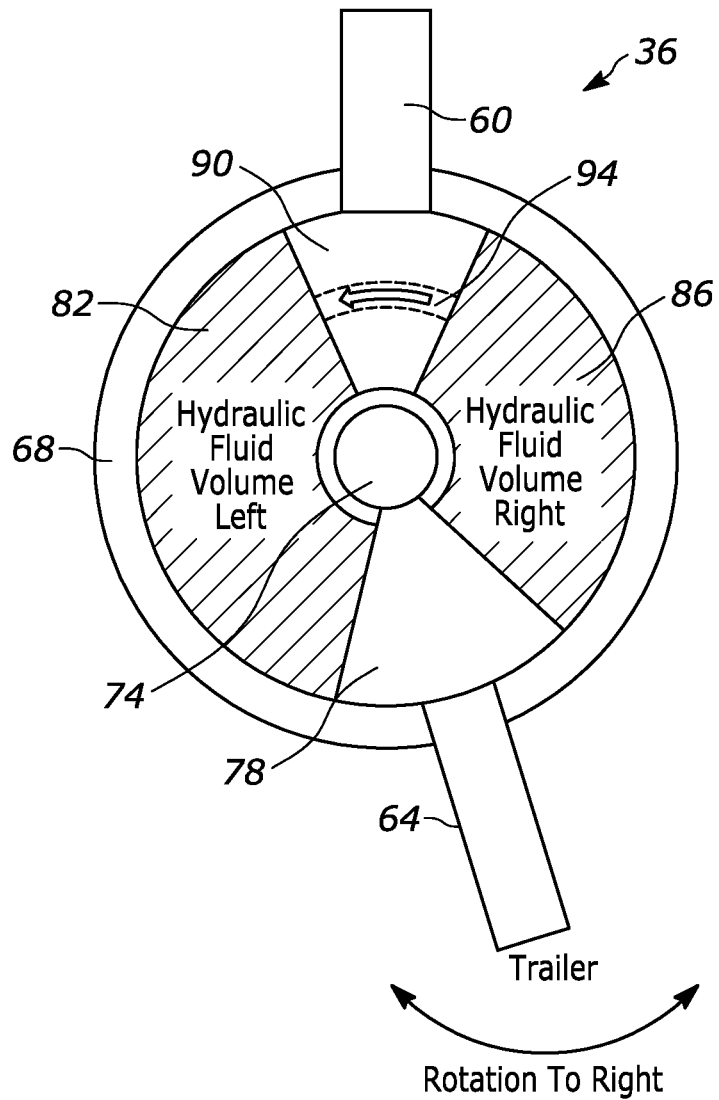
FIG. 5 illustrates a cross-sectional top view of a trailer hitch, according to some aspects.

FIGS. 4 and 5 illustrate example scenarios of the trailer hitch 36 during trailer 28 rotation in the first direction and the second direction, respectively. For example, when the trailer 28 rotates or sways in the first direction (e.g., to the left) relative to the tow vehicle 24, the paddle 78 pushes at least some of the hydraulic fluid of the first volume 82 through the valve 94 to the second volume 86, thereby increasing the second volume 86. In contrast, when the trailer 28 rotates or sways in the second direction (e.g., to the right) relative to the tow vehicle 24, the paddle 78 pushes at least some of the hydraulic fluid of the second volume 86 through the valve 94 to the first volume 82.

Figure 6:
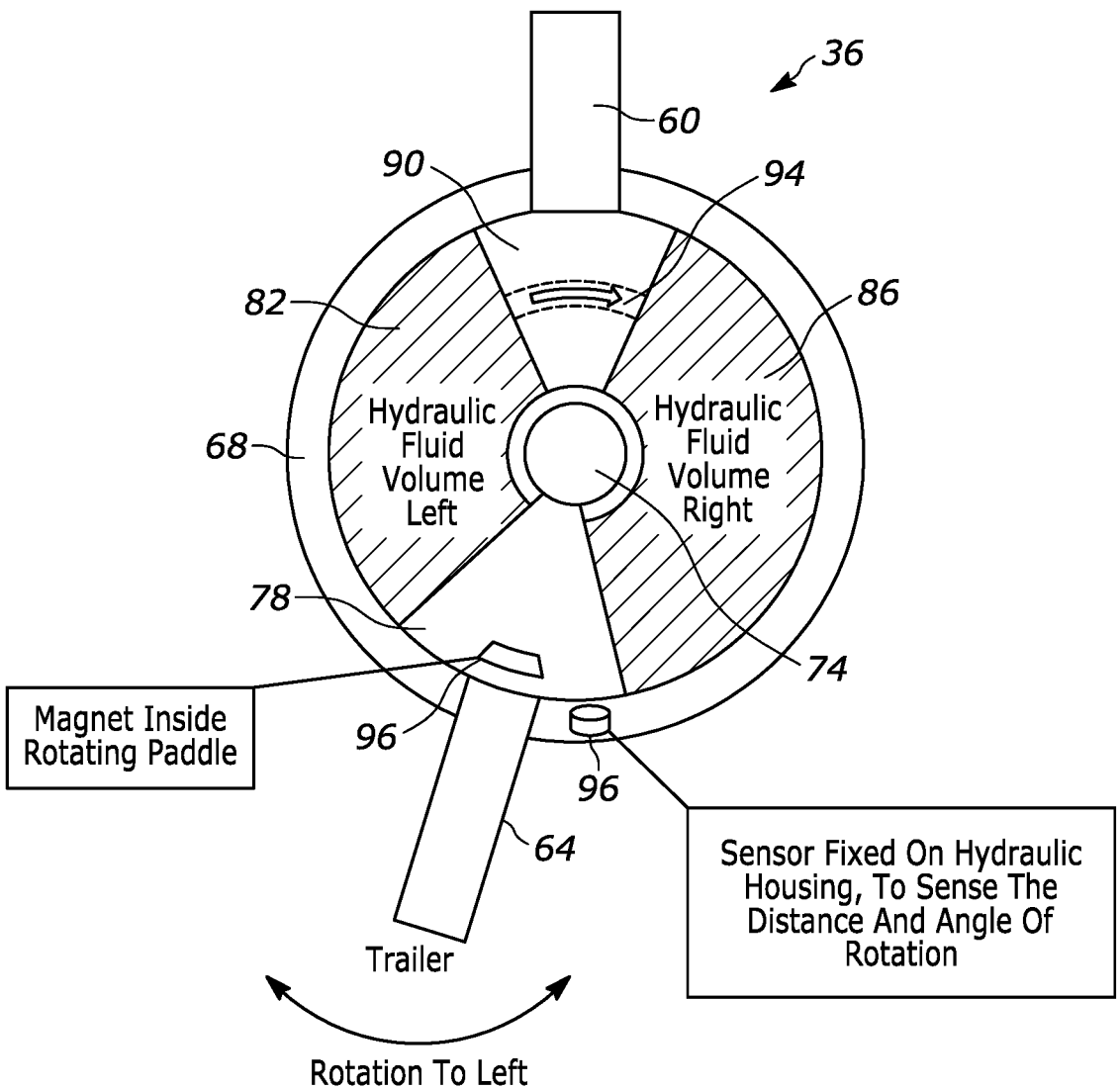
FIG. 6 illustrates a cross-sectional top view of a trailer hitch system, according to some aspects.

Referring now to FIG. 6, the trailer sensors 40 may include a paddle sensor 96 configured to measure the rotation of the paddle 78 in the chamber 68 relative to a reference point. For example, the reference point may be a point on the interior wall of the chamber 68. In some instances, the paddle sensor 96 includes a magnet embedded inside the paddle 78, and a magnetic sensor located at the reference point. As the paddle 78 rotates within the chamber 68, the magnetic sensor detects the relative location of the magnetic, and outputs corresponding sensor data to the electronic processor 48. The electronic processor 48 may further process 100 the sensor data in order to determine the angle of the trailer 28 relative to the tow vehicle 24, and control the valve 94 accordingly.

Figure 7:
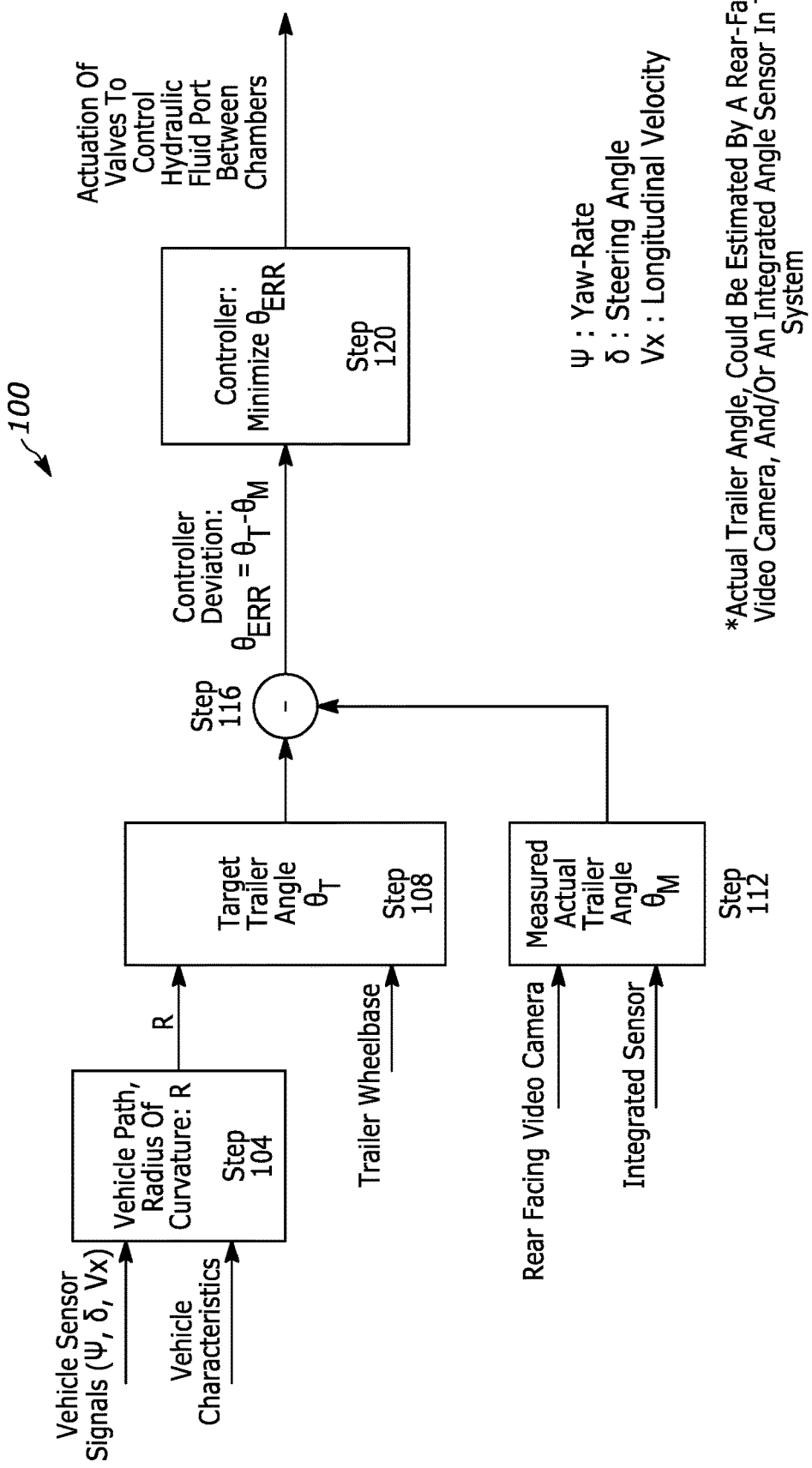
FIG. 7 illustrates a control process for controlling a trailer hitch system, according to some aspects.
Figure 8:
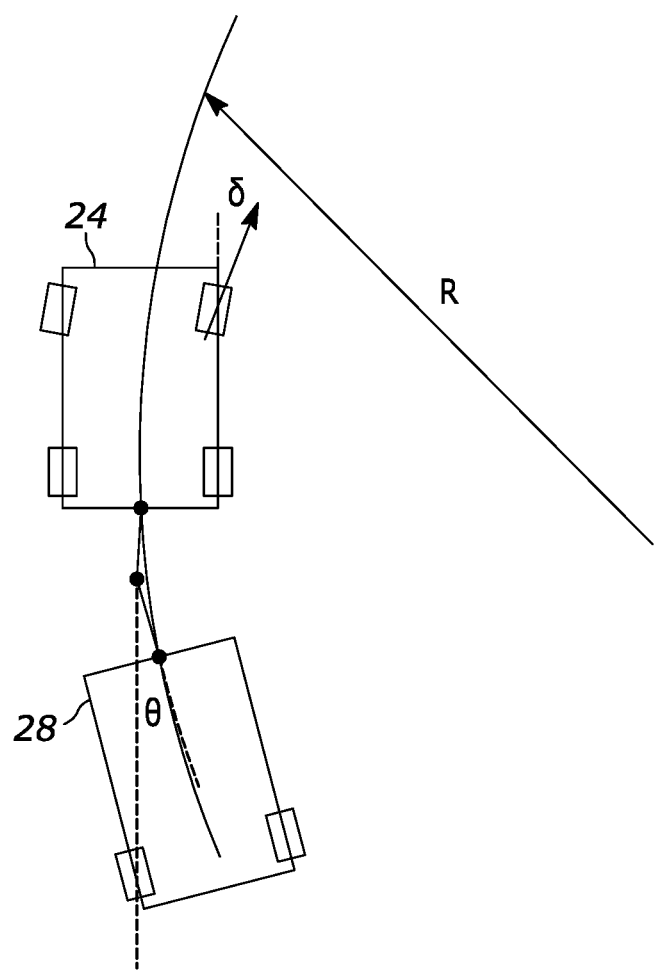
FIG. 8 illustrates a trailer hitch system, according to some aspects.

FIG. 7 illustrates an example control process 100 executable by the electronic processor 48 for controlling the chamber valve 94 in the trailer hitch 36. At step 104, the electronic processor 48 determines the path or trajectory of the tow vehicle 24 based on a received sensed yaw-rate $\psi$, a received sensed steering angle $\delta$, a received sensed longitudinal velocity $V_x$, and other vehicle characteristics (e.g., tow vehicle 24 weight, height, width, etc.). In particular, the electronic processor 48 determines the radius R of the tow vehicle trajectory. At step 108, the electronic processor 48 determines, based on the radius R and characteristics of the trailer 28 (e.g., the trailer 28 wheelbase), a target trailer angle $\theta_T$. The target trailer angle $\theta_T$ is an angle of the trailer 28 relative to the tow vehicle 24 that maximizes stability of the trailer 28 based on driving conditions. Referring to FIG. 8, for example, the target trailer angle $\theta_T$ may be the angle at which the trailer 28 is tangential to the circumference defined by the radius R.

Figure 9:
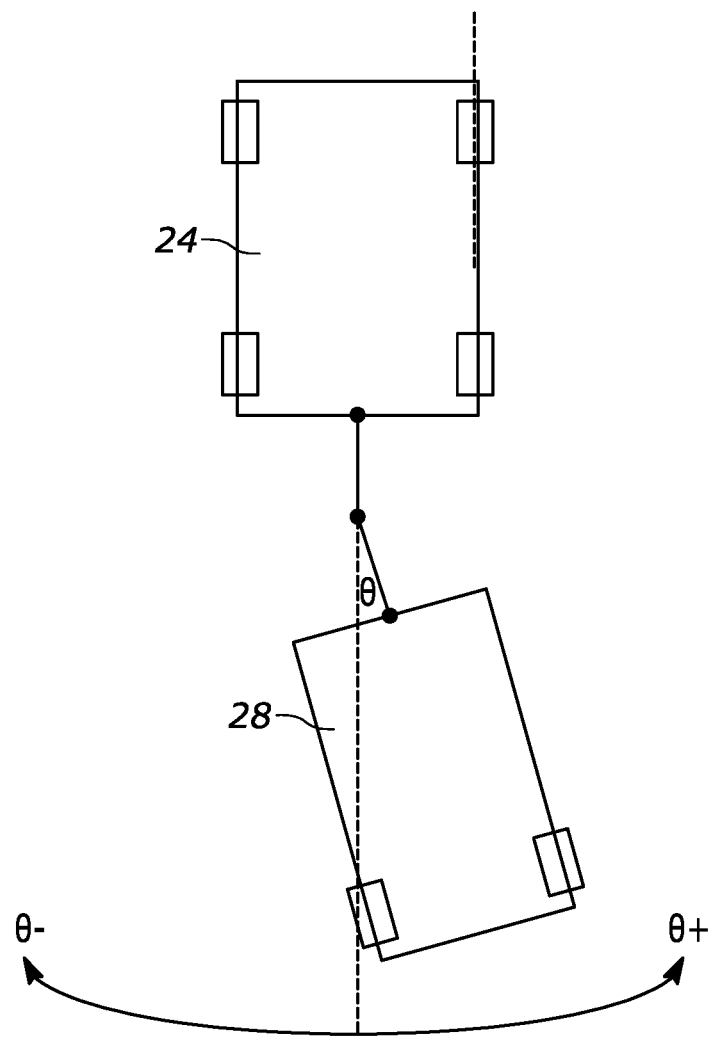
FIG. 9 illustrates a trailer hitch system, according to some aspects.

At step 112, the electronic processor 48 estimates, based on data received from the trailer sensors 40, the actual trailer angle $\theta_M$. For example, the electronic processor 48 may estimate the actual trailer angle $\theta_M$ based on images received from a rear view camera coupled to the tow vehicle 24, the chamber sensor 96 integrated in the trailer hitch 36, and/or any suitable sensor. At step 116, the electronic processor 48 determines the angle difference, or deviation, $\theta_{ERR}$ between the target trailer angle $\theta_T$ and the actual trailer angle $\theta_M$. At step 120, based on the angle difference $\theta_{ERR}$, the electronic processor 48 controls the valve 94 in the trailer hitch 36. Referring to FIG. 9, for example, after the tow vehicle 24 completes a turn and begins travelling straight ahead, the trailer 28 may experience resulting trailer 28 sway. In one example, the electronic processor 48 then determines that the angle difference $\theta_{ERR}$ has increased and, accordingly, the electronic processor 48 increases the opening of the valve 94 to improve stability of the trailer hitch system 20. As the hydraulic fluid in the trailer hitch 36 dampens the sway the of the trailer 28, the electronic processor 48 determines that the angle difference $\theta_{ERR}$ is decreasing, and accordingly the electronic processor 48 decreases the opening of the valve 94.

Figure 10:
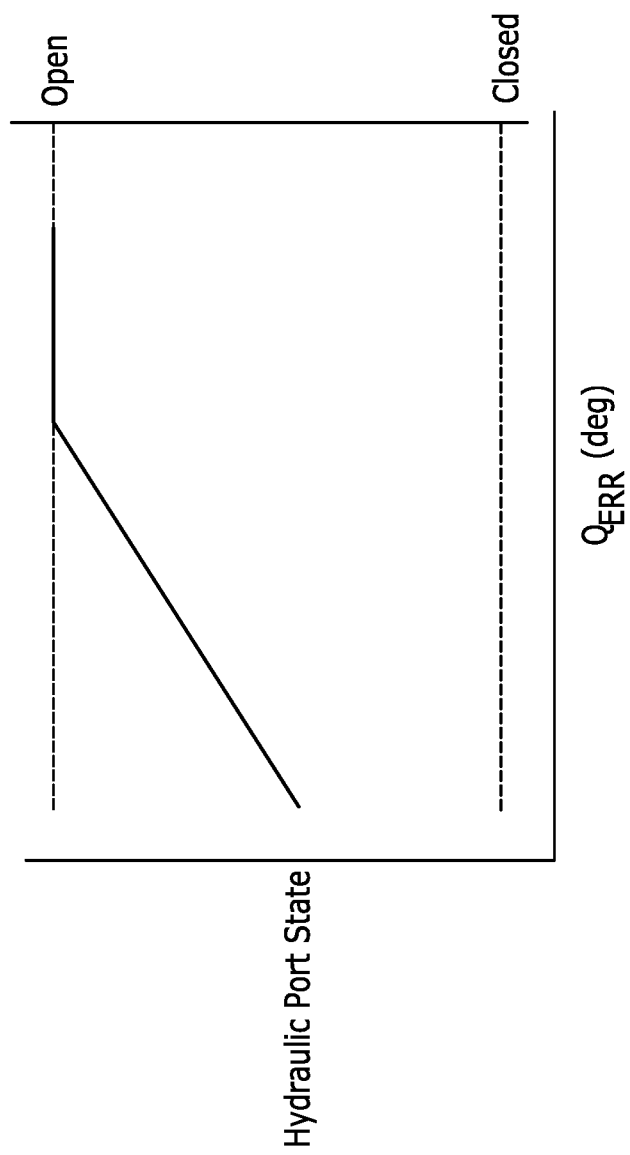
FIG. 10 illustrates a control plot corresponding to control of a trailer hitch system, according to some aspects.

To illustrate some of the control techniques implemented, FIG. 10 depicts a plot corresponding to control of the valve 94 based on the determined angle difference $\theta_{ERR}$. In one example, a large $\theta_{ERR}$ (e.g., greater than 60 degrees), result in the electronic processor 48 controlling the valve 94 to 100% open to decrease resistance experienced by the paddle 78, and prevent the trailer 28 from becoming unstable. In another example, a small $\theta_{ERR}$ (e.g., less than 20 degrees), results in the electronic processor 48 controlling the valve 94 to, for example, 0% open to increase resistance experienced by the paddle 78 and further dampen trailer sway. In cases of lane change or other anticipated turns, the electronic processor 48 opens the valve 94 to allow less restricted rotation of the trailer 28. Because the flow of some fluid through the valve 94 may be necessary to prevent the trailer hitch system 20 from becoming unstable even at a low $\theta_{ERR}$, in some implementations, the electronic processor 48 never fully closes the valve 94.

The control process 100 is described above with reference to the electronic processor 48, however, the control process 100 may be implemented in the trailer hitch system 20 in other ways. For example, the process 100 may be implemented by one or more controllers includes in the trailer hitch 36 or the trailer 28. Additionally, it should be understood that in some instances a "sensor" includes both sensing components and processing components (for example, a microprocessor) and, as a consequence, the sensor processes raw information or data and generates determinations. In general, whenever the term sensor is used it should be understood that the sensor may include both sensing and processing components and may be configured to generate data in particular formats, determinations regarding sensed phenomena, or other processed outputs.

Thus, aspects herein provide systems and methods for erratic driver detection. Various features and advantages are set forth in the following claims.

What is claimed is:

1. A trailer hitch system for connecting a tow vehicle and a trailer, the trailer hitch system comprising:
   a vehicle connector configured to be coupled to the tow vehicle and including a chamber, the chamber including a center, an interior wall, and a valve for modulating a flow of hydraulic fluid within the chamber;
   a pin extending through the chamber, the pin configured to rotate within the chamber;
   a paddle coupled to the pin and sized and shaped to sit substantially flush against the interior wall, the paddle configured to push the hydraulic fluid in a first direction and a second direction through the valve;
   a trailer connector coupled to the pin and configured to be coupled to the trailer; and
   an electronic processor configured to control the valve.

2. The system of claim 1, wherein
   the electronic processor is further configured to
   determine an actual angle of the trailer relative to the tow vehicle;
   determine a radius of the path of the tow vehicle;
   determine a target trailer angle based on the radius;
   determine an angle deviation based on the actual trailer angle and the target trailer angle; and
   control the valve based on the angle deviation.

3. The system of claim 2 wherein
   the electronic processor is configured to increase the opening of the valve in response to an increase in the angle deviation, and decrease the opening of the valve in response to a decrease in the angle deviation.

4. The system of claim 2, wherein
   the electronic processor is configured to
   receive a sensed yaw-rate, a sensed steering angle, and a sensed longitudinal velocity from sensors associated with the tow vehicle, and
   determine the radius of the path of the tow vehicle based on the sensed yaw-rate, the sensed steering angle, and the sensed longitudinal velocity of the tow vehicle.

5. The system of claim 2, wherein
   the chamber includes a sensor configured to measure a rotation of the paddle, and
   the electronic processor is configured to determine the actual trailer angle based on the measured rotation of the paddle.

6. The system of claim 2, further comprising a camera, and
   the electronic processor is configured to estimate the actual angle of the trailer based on images received from the camera.

7. A method for damping trailer sway in a trailer hitch system including a vehicle connector configured to be coupled to a tow vehicle and including a chamber, the chamber including a center, an interior wall, and a valve for modulating a flow of hydraulic fluid within the chamber, and a pin extending through the chamber and configured to rotate within the chamber, the method comprising:
   pushing, with a paddle coupled to the pin and sized and shaped to sit substantially flush against the interior wall, hydraulic fluid in a first direction and a second direction through the valve; and
   controlling, with an electronic processor, the valve.

8. The method of claim 7, further comprising:
   determining, with the electronic processor, an actual angle of a trailer relative to the tow vehicle;
   determining, with the electronic processor, a radius of the path of the tow vehicle;
   determining, with the electronic processor, a target trailer angle based on the radius;
   determining, with the electronic processor, an angle deviation based on the actual trailer angle and the target trailer angle; and
   controlling, with the electronic processor, the valve based on the angle deviation.

9. The method of claim 8, wherein
   controlling the valve includes increasing the opening of the valve in response to an increase in the angle deviation, and decreasing the opening of the valve in response to a decrease in the angle deviation.

10. The method of claim 8, further comprising:
    receiving, with the electronic processor, a sensed yaw-rate, a sensed steering angle, and a sensed longitudinal velocity from sensors associated with the tow vehicle; and
    determining the radius of the path of the tow vehicle based on the sensed yaw-rate the sensed steering angle, and the sensed longitudinal velocity of the tow vehicle.

11. The method of claim 8, further comprising:
    measuring, with a sensor included in the chamber, a rotation of the paddle; and
    determining, with the electronic processor, the actual trailer angle based on the measured rotation of the paddle.

12. The method of claim 8, further comprising:
    recording, with a camera included in the trailer hitch system, images; and
    estimating, with the electronic processor, the actual angle of the trailer based on the images.

* * * * *